(12) United States Patent
Thomas (10) Patent No.: US 9,625,690 B2
(45) Date of Patent: Apr. 18, 2017

(54) OPTICAL ARRANGEMENT FOR DIGITAL MICROMIRROR DEVICE

(71) Applicant: Cairn Research Limited, Faversham (GB)

(72) Inventor: Martin Thomas, Faversham (GB)

(73) Assignee: Cairn Research Limited, Faversham (GB)

( * ) Notice: Subject to any disclaimer, the term of this patent is extended or adjusted under 35 U.S.C. 154(b) by 0 days.

(21) Appl. No.: 14/513,528

(22) Filed: Oct. 14, 2014

(65) Prior Publication Data

US 2015/0146278 A1    May 28, 2015

(30) Foreign Application Priority Data

Nov. 26, 2013 (GB) .................................. 1320802.0

(51) Int. Cl.
*G02B 17/00* (2006.01)
*G02B 21/00* (2006.01)
(Continued)

(52) U.S. Cl.
CPC ..... *G02B 17/0605* (2013.01); *G02B 17/0812* (2013.01); *G02B 17/0896* (2013.01);
(Continued)

(58) Field of Classification Search
CPC .... G01J 3/021; G01J 3/0208; G02B 26/0833; G02B 17/0605; G02B 17/0812;
(Continued)

(56) References Cited

U.S. PATENT DOCUMENTS 4,226,501 A    10/1980    Shafer
6,667,830 B1  12/2003    Iketaki et al.
(Continued)

FOREIGN PATENT DOCUMENTS

DE    102005017207 A1    10/2006
EP    1615009 A1          1/2006
(Continued)

OTHER PUBLICATIONS

English-language abstract of German Patent Publication No. DE 102005017207 A1, Oct. 19, 2006.
(Continued)

*Primary Examiner* — Mahidere Sahle
(74) *Attorney, Agent, or Firm* — DASCENZO Intellectual Property Law, P.C.

(57) ABSTRACT

There is provided an optical arrangement comprising a digital micromirror device having a plurality of individually adjustable mirrors, a mirror pair formed from a convex mirror and a concave mirror having a common centre of curvature, the concave mirror having a greater radius than the convex mirror, characterised in that a collimated space is immediately adjacent the convex mirror, and the concave mirror is offset from the convex mirror so as to be capable of forming an image at an effective focal length of the mirror pair. The convex mirror and the concave mirror have radii substantially in the proportion 2.5:1, the concave mirror having the greater radius. A confocal microscope using such an arrangement is also provided.

16 Claims, 5 Drawing Sheets

(51) Int. Cl.
G02B 23/00 (2006.01)
G02B 17/06 (2006.01)
G02B 17/08 (2006.01)
G02B 21/04 (2006.01)
G02B 21/16 (2006.01)
G02B 21/18 (2006.01)
G02B 26/08 (2006.01)

(52) U.S. Cl.
CPC ..... *G02B 21/0048* (2013.01); *G02B 21/0076* (2013.01); *G02B 21/04* (2013.01); *G02B 21/16* (2013.01); *G02B 21/18* (2013.01); *G02B 26/0833* (2013.01)

(58) Field of Classification Search
CPC ........... G02B 21/0048; G02B 21/04; B01J 2219/00439; G03B 21/008
USPC .................................................. 359/364–366
See application file for complete search history.

(56) References Cited

U.S. PATENT DOCUMENTS

| | | |
|---|---|---|
| 2004/0125369 A1 | 7/2004 | Wang |
| 2005/0286047 A1 | 12/2005 | Boege |
| 2008/0024871 A1* | 1/2008 | Achal ................. G01J 3/02 359/615 |
| 2009/0112482 A1* | 4/2009 | Sandstrom ......... G01N 21/6452 702/19 |
| 2011/0089315 A1* | 4/2011 | Walt .................. G02B 17/0615 250/251 |
| 2012/0062864 A1* | 3/2012 | Kawabe .............. G03F 7/70233 355/67 |
| 2013/0063586 A1 | 3/2013 | Jovin et al. |

FOREIGN PATENT DOCUMENTS

| | | |
|---|---|---|
| EP | 2638423 A2 | 9/2013 |
| GB | 2442576 A | 4/2008 |

OTHER PUBLICATIONS

Search Report issued in connection with European Patent Application No. EP 14 18 5400, 2 pages, European Patent Office, Mar. 27, 2015.

Search Report issued in connection with United Kingdom Patent Application No. GB1320802.0, 1 page, United Kingdom Intellectual Property Office, Apr. 9, 2014.

* cited by examiner

OPTICAL ARRANGEMENT FOR DIGITAL MICROMIRROR DEVICE

RELATED APPLICATION

The present application claims priority to United Kingdom Patent Application No. 1320802.0, filed on Nov. 26, 2013, the complete disclosure of which is incorporated herein by reference.

FIELD

The present disclosure relates to an optical arrangement for a digital micromirror device and in particular an arrangement that can be used in fluorescence confocal microscopy.

BACKGROUND

Digital micromirror devices (DMDs) have a well-established use for the creation and projection of either still or moving images. They consist of rectangular arrays of miniature mirrors, each typically on the order of 15 microns on a side, and with an array size of typically 1024×768 such mirrors, although other configurations are also available. DMDs are manufactured by a semiconductor process, and each micromirror can be moved electrostatically between two fixed positions, typically 12° either side of the plane of the device. The device is typically illuminated at an angle of 24°, so that when a micromirror is at one 12° angle, reflection is orthogonal to the plane of the device, sending the reflected light to a projector. When the micromirror is at the other 12° angle, reflection is at an angle of 48° to the plane of the device, so in this case none of the reflected light is sent to the projector. Although DMDs are typically used in this single-sided "on/off" mode, they are nevertheless fully symmetrical devices, so the choice of which angle corresponds to "on", and which to "off", depends in practice on the chosen illumination angle. Also, these devices are completely binary in operation, but since each micromirror can be flipped between its two stable positions in just a few microseconds, the average illumination intensity from the device can be controlled by rapidly switching between micromirrors in the appropriate ratio. Full-colour illumination can also be readily achieved by sequential illumination of the device by different spectral ranges, and by appropriate control of the micromirror positions during illumination by each spectral range.

The very high illumination contrast that can be achieved in this way has made DMDs a very popular choice for video projection systems, as the optics for projecting a magnified image of the DMD onto a display screen are very straightforward, and the projected images can also be very bright since a DMD can tolerate a relatively high illumination intensity.

In some applications, the requirement to illuminate the DMD from a 24° angle causes problems where the DMD needs to be used "in reverse", most typically when the device needs to be used in a bidirectional mode. One such application is confocal microscopy, especially fluorescence confocal microscopy.

In a prior art DMD-based confocal fluorescence system, an Offner triplet is used to deliver light to and collect light from a DMD, so using the DMD to illuminate a sample and to collect fluorescence excitation light from a sample. The Offner triplet is a 1:1 image relaying system, based on two concave reflective regions and one convex one. The concave and convex reflective surfaces share a common centre of curvature and their radii are in a 2:1 ratio. The object and the image are on a plane that passes through the common centre of curvature. Light from an object is collected over an oblique range of angles to form a 1:1 image laterally inverted with respect to the object, but effectively occupying the same space. The arrangement of mirrors within the Offner triplet is such that it can only work for an off-axis object and image and so can only work at relatively oblique angles. Further the image is formed over the same oblique range of angles as was collected from the object, which means at an average angle of 24°. Some cameras may contain miniature lenses to better focus light onto individual pixels, and/or various masks to keep light away from other parts of the semiconductor chip. These will generally have been designed with the expectation of light arriving at significantly smaller angles of incidence than 24°, so may no longer operate optimally under these conditions. Further excitation light is introduced into the system in a manner that it is a source for astigmatism in the image.

SUMMARY

Optical arrangements and confocal imaging systems include a digital micromirror device having a plurality of individually adjustable mirrors and a mirror pair formed from a convex mirrors and a concave mirror having a common centre of curvature. The concave mirrors has a greater radius than the convex mirror. A collimated space is immediately adjacent the convex mirrors, and the concave mirrors is offset from the convex mirror so as to be capable of forming an image at an effective focal length of the mirror pair.

DESCRIPTION

In accordance with one aspect of the present disclosure, there is provided an optical arrangement comprising a digital micromirror device having a plurality of individually adjustable mirrors, a mirror pair formed from a convex mirrors and a concave mirror having a common centre of curvature, the concave mirrors having a greater radius than the convex mirror, wherein a collimated space is immediately adjacent the convex mirror and the concave mirrors is offset from the convex mirror so as to be capable of forming an image at an effective focal length of the mirror pair. This provides an optical path passing from the collimated space to reach the convex mirror, which is then reflected from the convex mirrors to the concave mirror, and then reflected from the concave mirror, to form an image at a distance beyond their common centre of curvature that corresponds to the effective focal length of the optical pair. This image is bidirectional and so if an image is formed from another optical pathway onto a reflective surface at the effective focal length, then it can be passed back to the concave mirror and thence to the convex mirror to reach the collimated space for subsequent refocussing to form a further image. The optical arrangement with the collimated space ensures that light can be directed normal (i.e. orthogonal) to an image receptor device rather than at an angle less than or greater than 90° to an image receptor device.

If desired, the digital micromirror device may be used to provide a reflective surface at the effective focal length.

Alternatively to allow spatial distances within the optical arrangement to be easily extended to allow more space for the digital micromirror device and any optics associated with the digital micromirror device, optical elements can be associated with the effective focal length position to create a secondary image at the digital micromirror device.

Although both the convex and concave mirrors are typically continuous circular reflective surfaces and share a common centre of curvature, they are at different angles with respect to their common centre of curvature, rather than one mirror being directly behind the other, so that light reflected from one mirror can then be reflected by the other, without having one mirror obstructing the other mirrors. For minimum optical aberrations, preferably the convex mirrors and concave mirrors have radii substantially in the proportions 2.5:1+/−10%, and more preferably substantially in the proportion $(\sqrt{5}+1)/(\sqrt{5}-1)$, the concave mirror having the greater radius. This gives a distance from the concave mirrors to the image of $(\sqrt{5}+2)$ times the effective focal length of the mirror pair, i.e. where the common centre of curvature corresponds to the position of a single optical component of the same focal length.

The optical arrangement preferably further comprises a light source arranged to produce a collimated beam within the collimated space and so incident on the convex mirrors. Typically a beam from the light source will be collimated by a lens, although this is not required if the light source is a laser, and if required may be passed through a filter element either before or after reaching the collimated space. For a laser as a light source, typically a beam expanding optic, such as a lens pair, will be used to maintain collimation whilst increasing the beam diameter.

Desirably a beam splitter element is disposed in the collimated space to provide separate optical pathways communicating with the light source and an image receptor device, such as a detector, camera, or image splitter.

If required, focussing means may be disposed between the beam splitter element and the image receptor device, the focussing means being by way of example of a single lens, a zoom lens assembly, a plurality of lenses or mirrors.

One or more optical components may be disposed in the collimated space so as to adjust optical characteristics, for example by using filters, polarisers.

The optical arrangement may further comprise a microscope, such that an image plane formed at the effective focal length of the mirror pair is on a common optical path with the microscope. The microscope may be any type of imaging microscope including a confocal imaging microscope.

Where the optical arrangement further comprises a microscope, preferably the collimated space is arranged to be parallel to and displaced from the optical path between the image plane and microscope.

In accordance with a further aspect of the disclosure, there is also provided a confocal optical imaging system comprising a digital micromirror device having a plurality of individually adjustable mirrors, a mirror pair formed from a convex mirrors and a concave mirror having a common centre of curvature, the concave mirrors having a greater radius than the convex mirror, wherein a collimated space is immediately adjacent the concave mirror and the concave mirrors is offset from the convex mirror so as to be capable of forming an image at an effective focal length of the mirror pair.

The confocal optical imaging system may have all or any combination of the preferred features discussed above in relation to the optical arrangement.

Figure 1:
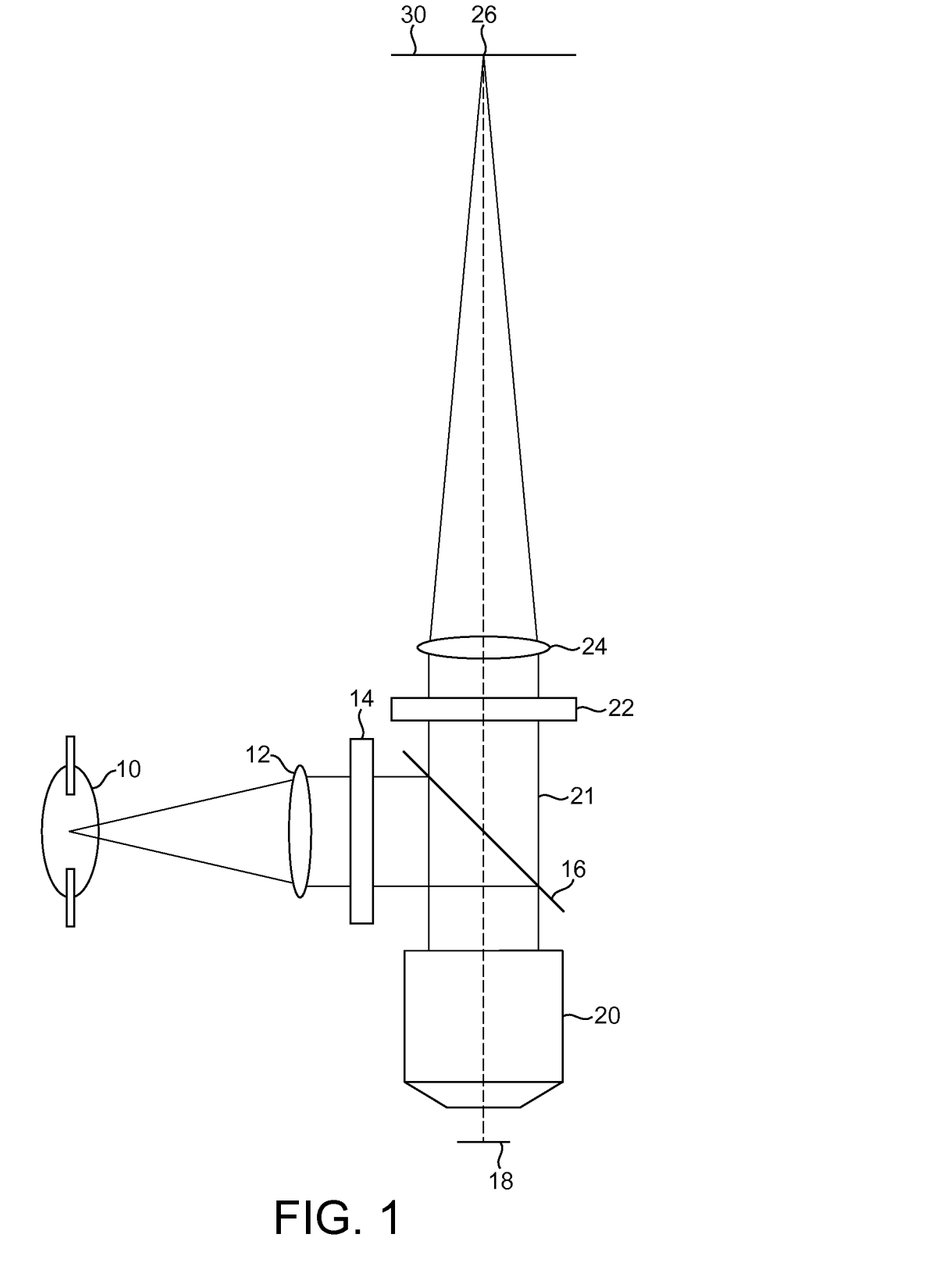
FIG. 1 shows a schematic diagram of a fluorescence confocal microscopy arrangement.

A typical fluorescence microscopy configuration is shown in FIG. 1. Light from an excitation source 10 is collimated by lens 12, and wavelength-filtered by filter 14, before being introduced into a microscope's imaging pathway by a mirror 16 angled at 45°. The optical characteristics of mirror 16 are such that shorter wavelength light, which is capable of exciting fluorescent molecules in sample 18, is reflected into the microscope's imaging pathway, where it is focussed by objective 20 onto sample 18. This excites the emission of longer wavelength light by the sample according to the nature of the fluorescent entities, such as compounds, molecules and atoms, present within it.

The emission light from sample 18 is collected by objective 20, which converts the light into a collimated beam 21. Since this light is of a longer wavelength range than the excitation light, and because of the wavelength-dependent reflective properties of mirrors 16, it is now transmitted by mirror 16 rather than reflected back towards light source 10. The wavelength range can be further restricted if required by filter 22, and then focussed by lens 24 to form an image 26. Image 26 is typically formed onto a detector or camera 30, but further optical components within the microscope (not shown) typically allow the image to be diverted for direct viewing through an eyepiece as an alternative. For best optical quality of image 26, it is important that angled mirror 16 is in a so-called "infinity" region of the light path. That is to say, the imaging light should be completely defocussed as it passes through component 16. If mirrors 16 is in a part of the light path where the light is converging to a focus, it is well known in the art that a degree of astigmatism will be introduced into the image which is undesirable.

For this so-called "wide-field" fluorescence microscopy, the entire sample 18 is both illuminated and imaged continuously, but this has the disadvantage that light originating from above and below the plane of best focus in specimen 18 also reaches detector 30. This problem can be greatly reduced by illuminating the specimen by a series of moving apertures which are imaged onto the specimen. The fluorescence emission light is reimaged onto these same apertures, so only light that is well-focussed at the aperture (which means that it has originated from the plane of best focus) will be able to pass through and reach detector 30. In order to build up a complete image, the apertures have to be scanned across the specimen so that all points within the specimen become illuminated during a given time period.

A particularly successful way of doing this has been to accommodate these apertures within a spinning disc, but size and spacing of the apertures are inevitably a compromise, and cannot easily be changed. Thus digital micromirror devices (DMDs), where both size and spacing of reflective areas is variable, have been considered for use in such applications.

However problems arise because of the 24° angle at which DMDs are normally illuminated. In a projection system, or for fluorescence excitation in confocal microscopy, all one requires is uniform illumination of the device at 24°, which is relatively straightforward to achieve. However, for fluorescence emission, one must reform an image from light that has been reflected at 24°, and yet to avoid focus and image distortion problems the image plane must be parallel to that of the DMD.

Figure 2:
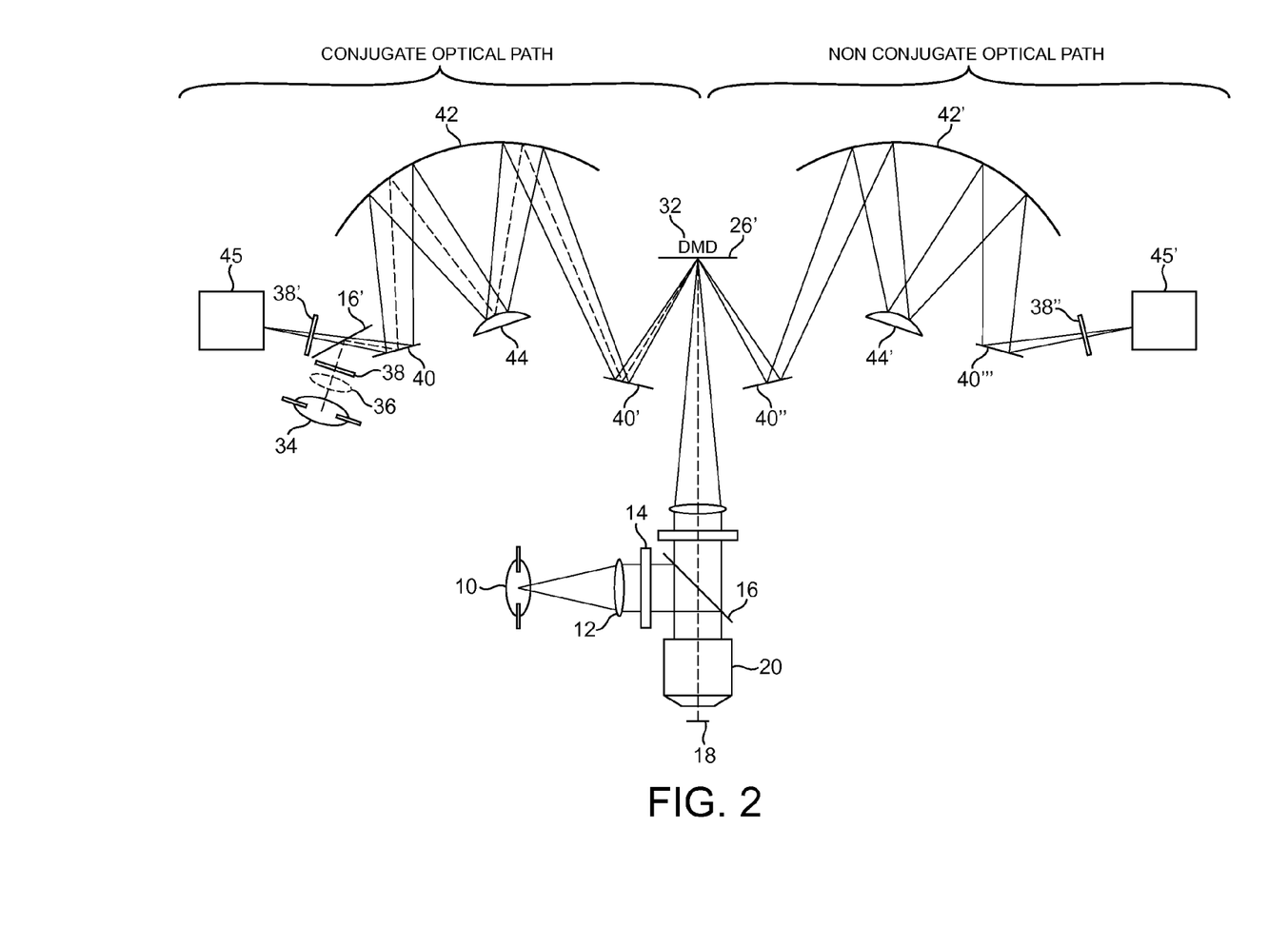
FIG. 2 shows a schematic diagram of a DMD-based confocal fluorescence system.

A DMD-based confocal fluorescence system which has previously addressed this problem is shown in FIG. 2. In this configuration, DMD 32 has been placed at primary image plane 26' of a commercial fluorescence microscope of the type previously described, and accessory optics have been added to deliver light to and collect light from DMD 32.

To provide fluorescence excitation light that has been spatially filtered by reflection from the "on" pixels of DMD 32 at primary image plane 26', a separate light source 34 must be provided and used in place of wide-field light source 10. Light from source 34 is collected by lens 36 and wavelength-filtered by filter 38, before being reflected into the imaging pathway by 45° mirror 16', which has similar wavelength-dependent properties to mirror 16 for the wide-field case. This light is delivered to uniformly illuminate DMD 32 via mirrors 40, 42, 44 and 40', all of which fully reflect light of all wavelengths. This illumination is centred on a 24° angle, so that DMD pixels in the "on" orientation reflect the light into objective 20, to form a demagnified image of the DMD at the sample 18, so that only certain discrete and controllable regions of DMD 32 are illuminated.

Fluorescence emission from sample 18 is collected by objective 20, and is now directed by mirrors 40', 42, 44 and 40, where it is then transmitted by wavelength-dependent mirrors 16' and filter 38' to form a focussed image at camera 45. Confocal detection occurs because only emission light that is focussed onto the "on" pixels of DMD 32 is reflected back through this pathway to reach camera 45. This is referred to as the "conjugate" emission pathway. However, FIG. 2 also shows the possibility of collecting the emission light that would normally be rejected by a confocal detection system. This light would fall on the "off" pixels of DMD 32, in which case it would be directed by mirrors 40''', 42', 44' and 40''', and filtered by wavelength-dependent filter 38'', to form a focussed image at a second camera 45'. This is referred to as a "nonconjugate" emission pathway, and this additional image can be used by software-based techniques for the improvement of overall image quality. Although not specifically shown in FIG. 2, it should be apparent to anyone familiar in the art that the system could be made fully symmetric in operation by providing an additional light source feeding the nonconjugate side, configured in the same way as light source 34, filter 38 and lens 36 on the conjugate side, and feeding into the light path by a further 45° mirror analogous to mirror 16'. Which is the conjugate and which is the nonconjugate side would then be a matter of choice, depending on which light source was used for fluorescence excitation.

The reason for the inclusion of mirrors 40, 42, 44, 40' in the conjugate imaging pathway, and mirrors 40''', 42', 44', 40'' in the nonconjugate imaging pathway, is to provide an optical system capable of forming a sufficiently high-quality image from light that has been collected from DMD 32 at a reflected angle centred on 24°, which in practice is likely to mean up to about 26°. To do so by conventional optics requires an extremely fast focal ratio equivalent to around f/1, or about 0.5 in numerical aperture terms, in order to encompass such a wide angle.

The arrangement of convex and concave reflective regions in FIG. 2 is known as an Offner triplet, also known as an Offner relay. This configuration is illustrated in more detail in FIG. 3. It is a 1:1 image relaying system, based on two concave reflective surfaces and one convex one, hence the name triplet, but the two concave surfaces can be two separated regions of the same mirror if preferred, and as shown in FIG. 2. The concave and convex reflective surfaces share a common centre of curvature, and their radii are in a 2:1 ratio. The object and the image are on a plane that passes through the common centre of curvature 48, see FIG. 3. In the following description of FIG. 3, the equivalent components on the conjugate side of FIG. 2 are shown in brackets for clarity.

In an Offner triplet, light from an object 50 (DMD 32) is collected over an oblique range of angles by concave reflective mirrors 52 (right hand part of mirror 42), which reflects it towards convex mirror 54 (mirror 44). This in turn reflects it back to another concave reflective mirror 56 (left hand part of mirror 42), with its surface concentric with that of mirror 52. That final reflection results in the formation of a 1:1 image 58 (at position of camera 45). To complete the comparison, it should be noted that mirrors 40 and 40' in FIG. 2 are both plane mirrors, and just serve to "fold" the optical pathway into a more convenient configuration, and hence do not change its imaging characteristics in any way. They therefore do not need to be represented in FIG. 3.

The odd number of reflections in the basic Offner configuration means that the image is laterally inverted with respect to the object, but effectively occupies the same space. On-axis light from the object is blocked by the reverse side of mirror 54 and therefore this configuration has to be used off-axis. Thus in FIG. 3, object 50 (DMD 32) is placed significantly to the right of the optical axis, so the laterally inverted image 58 (at position of camera 45) is consequently formed at an equivalent position to the left of the optical axis.

The Offner triplet configuration has two potentially significant problems in this application. First, its inherently symmetrical nature means that the image is formed over the same oblique range of angles as was collected from the object, which in this case means at an average angle of 24°. The problem here is that some cameras may contain miniature lenses to better focus light onto individual pixels, and/or various masks to keep light away from other parts of the semiconductor chip. These will generally have been designed with the expectation of light arriving at significantly smaller angles of incidence than 24°, so may no longer operate optimally under these conditions. Second, the 45° mirrors that introduces excitation light into the system, which in FIG. 3 would be sited between mirror 56 and image 58, is not in a collimated ("infinity") space as far as the imaging light is concerned and hence it is a source for astigmatism in image 58.

Figure 4:
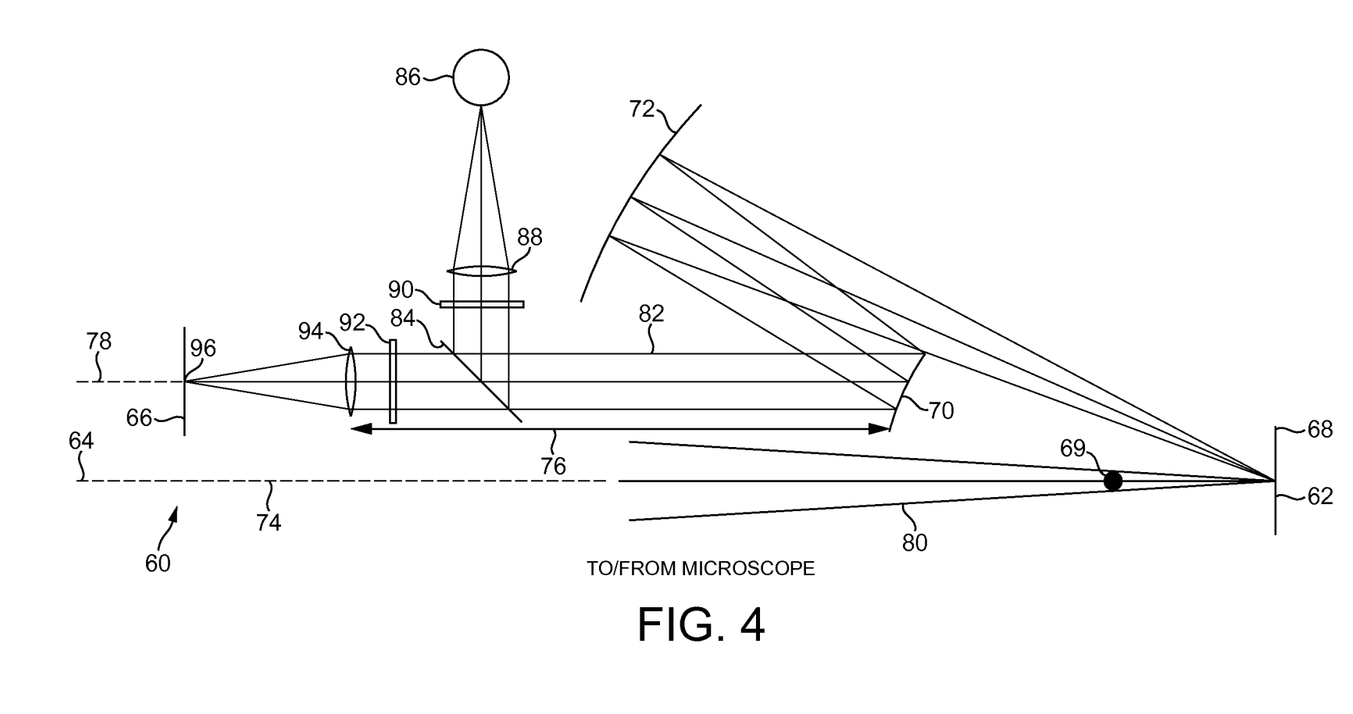
FIG. 4 shows a schematic diagram of one embodiment of a confocal fluorescence system in accordance with the present disclosure.

In FIG. 4, an optical arrangement in accordance with the present disclosure is shown in relation to a confocal imaging system. DMD 62 comprises a plurality of individually adjustable mirrors which are used to direct light into microscope 60 and so illuminate a sample 64 and to receive emitted light from sample 64 for transmission to a camera or other detector 66. DMD 62 is positioned at the relayed image plane 68 which is centred on the optical axis 74 of the light path to and from microscope 60. The common centre of curvature 69 of convex mirror 70 and concave mirror 72 is also located on optical axis 74. Mirrors 70 and 72 are arranged to ensure that neither mirror obstructs the on-axis light path 80 to and from microscope 60, and to ensure that collimated light incident on convex mirrors 70 is then reflected by concave mirror 72, to form an image 68 on DMD 62, without either mirror obstructing the optical pathway to the other. Mirrors 70 and 72 have radii in the relation $(\sqrt{5}+1)/(\sqrt{5}-1)$, the radius of curvature of convex mirror 70 being lower than that of concave mirror 72, and the distance from their common centre of curvature 69 to image 68 being given by the effective focal length of this mirror pair, which is also given by $1/(\sqrt{5}+2)$ of the radius of curvature of concave mirror 72. The ratio of the radii is chosen to avoid third-order optical aberrations although a ratio of around 2.5+/−10% will usually be sufficient.

Figure 3:
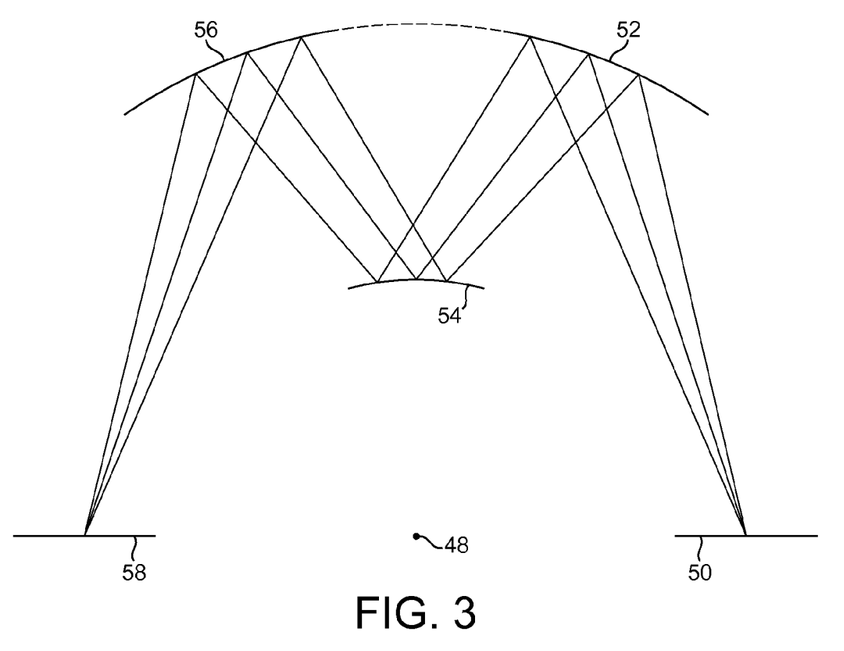
FIG. 3 shows a diagram of an Offner triplet.

With this optical arrangement, any unfocussed, i.e. parallel or collimated, beam incident on convex mirror 70 is deflected by concave mirror 72 and brought to a focussed image at image plane 68. This image is free from third-order spherical aberration, coma and astigmatism, as long as the numerical aperture of the system is defined by a stop at the common centre of curvature 69 of the concave and convex mirrors. In practice the numerical aperture will be low, because of the restricted diameter of the lenses comprising the microscope objective. Ideally an image of the rear opening of a microscope objective, which forms the aperture stop of the overall system, should be formed at the centre of curvature 69 in order to fulfill this condition, but in practice the low numerical aperture means that this is a preferable rather than a critical requirement. Although the Offner triplet used in the prior art, and as discussed in relation to FIGS. 2 and 3, is also free from third-order aberrations, it can only relay a 1:1 image, rather than generating an image from a collimated beam or reforming a collimated beam from an image.

The converging light path of emitted light from microscope 60 is centred on axis 74 and is shown as beam 80. The light incident on DMD 62 from microscope 60 is reflected onto concave mirror 72 and in turn reflected from convex mirror 70 to form collimated beam 82 in collimated space 76, adjacent to and extending from convex mirror 70 along optical axis 78. The collimated light is substantially displaced from optical axis 74, while remaining parallel to it, and arrives at a direction normal to an image detector surface, such as camera 66, rather than arriving at a 24° angle. To introduce incident light into the system, light from source 86 is collimated by lens 88 and filtered by filter 90, and this collimated beam is introduced into collimated pathway 76 by placing 45° mirror 84 in collimated pathway 76. The source light beam thus does not introduce any astigmatism into the focussed image.

To refocus beam 82 to produce a camera image, beam 82 is sent through emission filter 92 and then focussed with a much smaller lens 94, with its optical axis 78 centred on beam 82 itself, to produce camera image 96 along this axis. The imaging light covers only a small angular range with respect to axis 78 because the displacement of optical axis 78 from optical axis 74 introduces an angular skew in the imaging pathway, to counter the 24° skew from DMD 62.

Since the focal ratio of lens 94 needs to encompass only the angular range of the light coming from DMD 62, rather than the 24° angle itself, its required optical performance is now much less demanding. Therefore, a wider range of focussing means can be used instead of lens 94. Suitable focussing devices could include, for example, a zoom lens assembly to provide a variable magnification ratio. Since both DMD 62 and camera 66 are pixellated devices, this can be desirable so that an integer relationship can be established as to how the DMD pixels project onto those of the camera(s). Alternatively, since zoom lenses can be optically quite complicated, a simpler varifocal combination of two lenses can be used, in which the distance between the two lenses is varied to change the magnification. Unlike a zoom lens, this would require the distance to camera 66 to be changed as well in order to maintain focus, but that would not be a problem in practice as the magnification ratio would not need to be regularly adjusted. As another alternative, in order to obtain perfect chromatic performance (although achromatic lenses should perform well enough in practice and would be much more convenient) refocussing could be via a further concave mirror, used just slightly off optical axis 74 in order to separate the incoming and reflected beams.

The configuration shown in FIG. 4 confers enormous practical advantages over the prior art. For example, the length of the "infinity" region 76 between convex mirror 70 and lens 94 can be made variable, to accommodate additional components, such as polarisers, or filter wheels for rapid wavelength selection, or one or more further mirrors functioning in a similar way to mirror 84 to allow light from additional sources to be introduced into the system. Alternatively, since the focussing pathway from lens 94 to camera 66 now has a beam centred on optical axis 78, rather than at a 24° angle, as it would if it were centred on optical axis 74, it becomes much more feasible to insert further optical components into this pathway. Many components such as filters and polarisers can be used in a focussing pathway as well as an "infinity" pathway as long as the angular range of the beam is small, which it now is. Since camera 66 is likely to be external to the rest of the optical system, at least part of this focussing pathway is likely to be external too, which is likely to make such a location very convenient in practice.

Another substantial practical advantage over the prior art is that the final image in FIG. 4 need not be sent directly to a camera. Since it is now formed from light that encompasses a small angular range around optical axis 78, it is now suitable for relaying to further devices. A particularly attractive device in this context is an "image splitter", as disclosed for example in EP 1615009 and GB 2442576. Such devices separate a single image, on the basis of criteria such as wavelength, polarisation or relative focus, into two or more images on different regions of a single camera. They can easily be used here, whereas their operation at an angular beam range centred on 24° would be totally unfeasible.

Light sent to or collected from a microscope objective necessarily has a relatively low angular range, corresponding to a focal ratio of typically no more than about f/15 (or about NA 0.035). The pixellated nature of DMDs, coupled with the angled nature of the micromirrors, causes some diffractive dispersion of the reflected beams. The effect is wavelength-dependent, but at mid optical wavelengths of around 500 nm the angular separation of these orders is around 2 degrees, but nearly all the light is confined to within an approximately +/−2 order range. The optical system shown in FIGS. 4 and 5 has been designed to operate at a correspondingly faster focal ratio of approximately f/5.5 (or about NA 0.09) in order to capture these orders. This focal ratio is not so fast as to affect performance with respect to optical aberrations.

It can be convenient in practice to incorporate one or more plane mirrors in the optical pathway, in order to "fold" the pathway into a more compact and convenient shape. For FIG. 4 if desired, two such mirrors could be placed in the relatively long pathway between image plane 68 and concave mirror 72. Ideally, such mirrors should be orientated so as to reflect into the same plane as the other components in the optical pathway, or into another plane orthogonal to it, otherwise the refocussed images will have been rotated through some intermediate angle by these reflections. However with DMDs the two reflected angles are both diagonal to the DMD, rather than being left:right or up:down, and when the optimal foldings are chosen for spatial reasons, the image rotations become effectively arbitrary. This is technically of no consequence, but the requirement for a corresponding angular rotation of the camera(s) with respect to the original microscope image can be disconcerting to the user.

For a practical commercial instrument, to be used with an unmodified microscope, it is often desirable to use relay optics to create a secondary image somewhat further away, to allow more room for the DMD and its associated optics. Although the image rotation from the DMD to the camera(s) may be arbitrary when the other previously described considerations are taken into account, it can be accurately calculated or measured by those familiar with the art. The image relaying optics from the microscope image plane to the DMD can therefore be specifically designed (and with no optical compromise, if, as is likely to be the case, fold mirrors are also incorporated here for spatial reasons) to introduce a compensatory rotation in this pathway. The DMD can now be orientated so as to take this rotation into account, which is such that it exactly counters the rotation produced by the fold mirrors in the optical pathway between the DMD and the camera(s). This thereby restores the desirable situation of the camera image(s) being orthogonal with respect to the primary microscope image.

Furthermore, it is preferable for the image relaying system to be telecentric. That is to say, the angular range of the light coming from the relayed image is the same as that coming from the primary microscope image, so that the optical characteristics of the two images are identical. This is most easily achieved by using two lenses of equal focal length (for a 1:1 image relay) separated by a collimated region equal to the sum of their focal lengths, which allows ample space for fold mirrors that are orientated appropriately to provide the required image rotation through the relay pathway. As an additional useful refinement, a variable rectangular aperture can be incorporated at the primary image plane. This would typically be set to a size such that its focussed image at the DMD exactly corresponds to the active area of the DMD. The rotation of the DMD relative to the primary microscope image will compensate for the image rotation through the relay pathway, so the diaphragm image will remain orthogonal to the DMD.

To minimise aberrations as previously noted, the preferred position for the aperture stop for this configuration (or in this case an image of the aperture stop of the overall system) is at the centre of curvature of the two mirrors. In the overall system, the aperture stop is formed by the rear aperture of the objective, so ideally an image of it should be formed at or near that location. In order to control the precise location of that image, a "field lens" can be incorporated in the image relaying pathway. Such a lens is placed close to the primary microscope image, at which location it has little effect on the image relay, but its focal length is selected so as to locate an image of the rear aperture of the objective at or near the centre of curvature of these two mirrors. The optimum power of this lens will depend to some extent on the length of the "infinity" section in the microscope, as well as on the characteristics of the image relay system itself. In practice a focal length can be chosen such that a reasonable approximation to the optimum condition can be obtained for most if not all commercial microscopes.

All these features are incorporated in the practical implementation which is now described.

Figure 5:
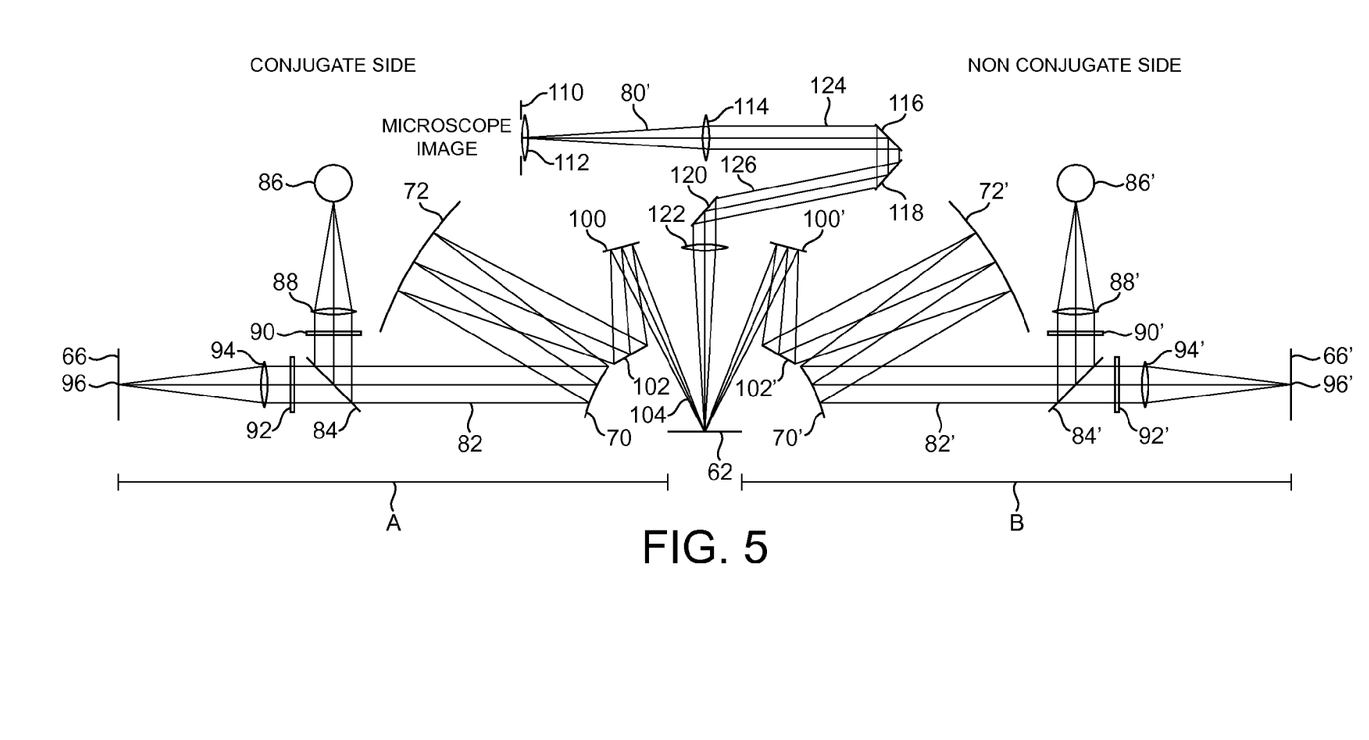
FIG. 5 shows a schematic diagram of a second embodiment of a confocal fluorescent system in accordance with the present disclosure.

FIG. 5 shows a practical implementation of the system described in relation to FIG. 4. To accommodate conjugate and nonconjugate optical pathways respectively, the arrangement of FIG. 4 is replicated at each 24° position of DMD 62. Relay optics are also shown for projecting the primary microscope image onto DMD 62. On the conjugate side A, plane mirrors 100 and 102 allow DMD 62 to be reoriented as shown, and also fold the optical pathway to make it more compact. In addition, mirrors 100, 102 redirect the optical pathway such that beam 82 and its associated optics are within the plane of the Figure, whereas beam 104 has a direction that is partially coming out of the plane of the Figure because the micromirrors of DMD 62 tilt around a 45° angle with respect to the plane of the Figure, rather than being left:right or up:down.

The nonconjugate pathway is effectively identical to the conjugate pathway with DMD 62 shared. The nonconjugate light source 86' and its associated components are optional, but if they are provided, then the system is completely symmetrical. Thus, if light source 86' is used instead of light source 86, camera 66' rather than camera 66 would receive the conjugate image, and camera 66 rather than camera 66' would receive the nonconjugate image.

As previously noted, although it is possible in principle to locate DMD 62 at the primary microscope image plane as shown in FIG. 2, in practice that is difficult to achieve. While not essential, an optical relay pathway performing the functions of components 110, 112, 114, 116, 118, 120, 122 is likely to be necessary in practice. Here the primary microscope image, typically taken from a "camera port" on the microscope, is located at the rectangular diaphragm 110, which provides a field stop for the imaging pathway. An image of this diaphragm 110, as well as an image of the primary microscope image itself, is relayed onto DMD 62. The location of field lens 112, close to the primary microscope image, is such that it has little effect on the size or position of the image relayed to DMD 62, but the power of this lens is chosen so that the rear aperture of the microscope objective, which forms the aperture stop for the overall system, is reimaged at or close to the common centres of curvature of the mirrors pairs 70, 72 and 70', 72'. The incorporation of field lens 112 is not essential but will also help control beam diameters through the relay system, thereby minimising the risk of significant aberrations or vignetting.

Light beam 80' from the primary microscope image is collimated by lens 114, and then reflected by plane mirrors 116, 118 and 120, before being refocussed onto DMD 62 by lens 122. The re-imaging onto DMD 62 will generally but not necessarily be at or around unity magnification. As previously noted, an unwanted effect of fold mirror pairs 100, 102 and 100', 102' is that they may introduce a certain degree of rotation of camera images 96 and 96' relative to the orientation of DMD 62. Although this could be dealt with by reorienting the cameras, it may not be a very attractive solution from a user point of view, so FIG. 5 shows how a compensatory rotation can instead be introduced into the image relay pathway. DMD 62 can now be oriented to match that rotation, so that the rotation in the optical pathway from DMD 62 to cameras 66, 66' now restores a fully orthogonal relationship between the camera images and the primary microscope image.

This can be achieved as follows, although it can only indirectly be demonstrated in FIG. 5, as it requires the optical relay pathway to come out of the plane of the Figure. Mirrors 116 and 118 are shown there as displacing the optical pathway within the plane of the Figure, whereas mirrors 116 would actually direct beam 124 into or out of the plane of the paper (according to the required direction of image rotation), and mirrors 118 would reflect beam 126 up or down by an angle according to the required degree of image rotation, with mirror 120 being appropriately oriented so as to receive that beam and direct it towards DMD 62. Thus beam 126 would actually be directly above or below beam 124 and at a vertical rather than a horizontal angle to it, so with respect to the plane of the Figure, mirrors 120 would actually reflect beam 126 by 90° towards DMD 62. That is to say, mirrors 116, 118 and 120 are all in the same vertical plane. While this configuration may appear elaborate, fold mirrors in the optical relay pathway are likely to be desirable anyway in order to keep it reasonably compact, so incorporating this compensatory optical rotation within it does not necessarily add any additional complexity.

The optical pathway from DMD 62 to cameras 66 and 66' has a relatively short focal ratio of around f/5.5 in order to collect sufficient diffracted beams from the DMD. For optimum illumination (and hence fluorescence excitation) efficiency, a similarly short focal ratio for the optical pathway from DMD 62 to the microscope would be desirable, but the focal ratio of this pathway is restricted by the rear aperture of the microscope objective, to typically around f/15, so the collimated beam diameters in the relay pathway, e.g. beam 124 compared with beams 82 and 82', are shown relatively smaller in FIG. 5. The consequential loss of some diffracted beams can be compensated for by using a correspondingly brighter light source.

The invention claimed is:

1. An optical arrangement comprising:
   a digital micromirror device having a plurality of individually adjustable mirrors;
   a mirror pair formed from a convex mirror and a concave mirror having a common centre of curvature, the concave mirror having a greater radius than the convex mirror; and
   an image detector surface;
   wherein a collimated space is immediately adjacent to and extends from the convex mirror towards the image detector surface so as to be normal to the image detector surface, wherein the concave mirror is offset from the convex mirror so as to be capable of forming an image at an effective focal length of the mirror pair, and wherein the digital micromirror device is located at an effective focal length of the mirror pair.

2. The optical arrangement according to claim 1, wherein at least one optical element is placed at the effective focal length of the mirror pair to create a secondary image at the digital micromirror device.

3. The optical arrangement according to claim 1, wherein the convex mirror and the concave mirror have radii substantially in the proportion 2.5:1, the concave mirror having the greater radius.

4. The optical arrangement according to claim 3, wherein the radii are in the proportion $(\sqrt{5}+1)/(\sqrt{5}-1)$.

5. The optical arrangement according to claim 1, wherein both the convex mirror and the concave mirror are continuous substantially circular surfaces.

6. The optical arrangement according to claim 1, further comprising a light source arranged to produce a collimated beam within the collimated space.

7. The optical arrangement according to claim 6, wherein a beam from the light source is collimated by a lens before reaching the collimated space.

8. The optical arrangement according to claim 1, wherein a beam splitter element is disposed in the collimated space to provide separate optical pathways.

9. The optical arrangement according to claim 8, further comprising an image receptor device where imaged light is directed normal (i.e. orthogonal) to the image receptor device.

10. The optical arrangement according to claim 9, wherein a focussing element is disposed between the beam splitter element and the image receptor device.

11. The optical arrangement according to claim 1, wherein one or more optical components is disposed in the collimated space.

12. The optical arrangement according to claim 1, further comprising a microscope, such that an aperture stop is disposed between the microscope and the concave mirror and the aperture stop is on a common optical path with the microscope.

13. The optical arrangement according to claim 12, wherein the collimated space is arranged to be parallel to and displaced from an optical path between the aperture stop and the microscope.

14. The optical arrangement according to claim 12, wherein the microscope is a confocal imaging microscope.

15. The optical arrangement according to claim 14, wherein optical paths are provided for conjugate and non-conjugate images.

16. The optical arrangement according to claim 1, wherein the common centre of curvature is located on an optical axis of the digital micromirror device, and wherein the optical axis is substantially displaced and parallel to the collimated space.

* * * * *